2,959,522

PROCESS FOR PREPARING BETA-CAROTENE

James E. Zajic, Muscatine, Iowa, assignor to Grain Processing Corporation, Muscatine, Iowa, a corporation of Iowa No Drawing. Filed Jan. 12, 1959, Ser. No. 786,056

19 Claims. (Cl. 195—28)

This invention relates to a fermentation process and has for an object the provision of a process for producing beta-carotene by a fermentation method.

It is known that beta-carotene may be synthesized by certain microorganisms when cultivated in an aqueous nutrient medium. Microorganisms that have been found to be suitable for this purpose are species within the genus Choanephora (formerly Blakeslea). However, in the cultivation of a microorganism of the genus Choanephora, the yields of beta-carotene are not always what could be desired and the art has been looking for means whereby the yields of beta-carotene can be substantially increased in fermentations of this general type. It is also known that in the cultivation of the Choanephora organisms the mycelium has a tendency to clump as the fermentation proceeds, thereby resulting in poor oxygen transfer to the mycelium in the interior of the clump. As a result when this clumping occurs, a corresponding reduction in the amount of beta-carotene synthesized is observed. The use of both surface-active agents and high viscosity media has been suggested to prevent clumping during the growth of organisms of this type. However, the surface-active agents are sometimes toxic to the growth of the organism and in certain instances the high viscosity medium presents problems in the subsequent handling of the fermentation mash after the fermentation has been completed.

Accordingly, one object of this invention is to provide a process for synthesizing beta-carotene in increased amounts.

A further object of this invention is to provide a process whereby beta-carotene production is stimulated when a nutrient medium is inoculated with a microorganism of the genus Choanephora.

A still further object of this invention is the provision of a process which will prevent clumping of the Choanephora microorganism when cultivated in a nutrient medium which is employed for beta-carotene synthesis.

Further and additional objects will appear from the following description and the appended claims.

In accordance with one embodiment of this invention, a process is provided for preparing beta-carotene which includes the step of cultivating a beta-carotene-producing strain of a microorganism of the genus Choanephora in a nutrient medium containing one or more compounds or compositions which are related to the terpenes and are hereinafter defined as a group as terpenoid substances. The terpenoid substances which have been found to be suitable for the stimulation of beta-carotene production are selected from the group consisting of cedarwood oil, sprucewood oil, sandalwood oil, oil rose of geranium, cedarleaf oil, camphor, alpha-irone, cedrol, cedrenol, cedryl acetate, cedrenyl acetate and cedrone.

In accordance with a further aspect of this invention, it has also been found that additional stimulation of beta-carotene formation is obtainable if an ionone is added to the fermentation medium along with the terpenoid substance. The ionones that are particularly suitable for this purpose are those selected from the group consisting of beta-ionone, alpha-ionone, methylionone-alpha, methylionone-beta, methylionone-gamma, methylionone-delta and mixtures thereof.

The nutrient medium to which the terpenoid substance and, if desired, the ionone are added is of the conventional type known to be useful for the cultivation of the Choanephora microorganisms. Thus the aqueous medium ordinarily contains a source of carbohydrate, a nitrogen source such as a protein, a vegetable oil and usually a source of minerals, as is well known. In addition, vitamins and amino acids may be added if desired.

As will be apparent, any beta-carotene-producing strain of the genus Choanephora may be employed in accordance with this invention. The species that has been found to be particularly suitable, however, is *Choanephora trispora*. These organisms are aerobic in nature and, accordingly, the fermentation is carried out under aerobic conditions which may be provided by agitation or aeration of the medium during the incubation period.

For a more complete understanding of this invention, reference will now be made to one specific example of a process for carrying it out. However, it will be apparent that this invention is not limited to the specific details given in this example.

EXAMPLE

A basal aqueous formentation medium is prepared containing 10% distillers' solubles solids, 1% starch, 3% soybean oil, 0.001% thiamine, 0.5% cedarwood oil and 0.09% beta-ionone. This medium is sterilized in the usual manner and cooled to about 28° C. It has a pH of about 6.2. The inoculum is then prepared by cultivating *Choanephora trispora* on a dextrose-carboxymethyl cellulose-phytone medium and a 48 hour inoculum in the total amount of 8% is used to inoculate the basal fermentation medium. One-half of this 8% inoculant is *Choanephora trispora* NRRL 2456 and the other half is *Choanephora trispora* NRRL 2457. The inoculated medium is then incubated under aerobic conditions at 28° C. for six days. The beta-carotene produced is contained primarily in the mycelium and the amount of beta-carotene produced corresponds to about 340 milligrams for each liter of medium fermented.

After the fermentation, the mycelium is separated from the mash by standard centrifuging or filtration techniques and treated by conventional processes to stabilize the beta-carotene. The mycelium may be dried and sold directly as a feed grade beta-carotene product. If desired, crystalline beta-carotene may be prepared by well known procedures which involve extracting the mycelium with acetone, concentrating the extract in vacuo and saponifying the concentrated product with alcoholic potassium hydroxide. The beta-carotene present in the saponified concentrate is passed into petroleum ether and the acetone and saponified material removed by washing with water. Beta-carotene is easily crystallized by additional concentration of the petroleum ether extract.

With respect to the basic nutrient medium that may be used for cultivating species of Choanephora, it should ordinarily include the usual carbohydrate source, nitrogen source, vegetable oils, minerals and the like that are known to be necessary or desirable for achieving good growth and development of these microorganisms. Thus the medium should include a carbohydrate such as starch or starch-containing materials, such as milo, rye, red dog, cornstarch or the like. Also other carbohydrates, such as dextrin, glucose or other fermentable sugars may be used. It is preferred that the amount of carbohydrate in the fermentation medium range between about ½ and 4 percent by weight. With respect to the nitrogen source, any proteinaceous material may be satisfactory for this purpose, such as distillers' solubles, acid hydrolyzed corn, cottonseed meal, soy flour, corn gluten meal and the like. The amount of proteinaceous material in the fermentation medium may be varied, but suitably it is within the range of from about 4 to 12 percent by weight.

It is known that vegetable oils are useful for promoting the growth of these organisms and, accordingly, it is preferred that vegetable oils in the amount of from 0.5 to 4.5 percent by weight be included in the medium. Suitable vegetable oils are soy bean oil, corn oil, castor bean oil, rapeseed oil, sesame oil, rice oil, mustard seed oil, olive oil, linseed oil, peanut oil or other glycerides of vegetable origin.

The optimum and preferred pH for the medium is between about 5.5 and 7.5, while the preferred temperature of incubation is between about 22° and 32° C. Ordinarily the fermentation will be complete and may be harvested in from 3 to 12 days. However, as indicated, six days is usually satisfactory.

It will also be appreciated that other growth-promoting substances or supplements may be added to the medium in addition to those specifically indicated above, such as minerals, vitamins, trace elements, amino acids and the like, and these supplemental additives include leucine, isoleucine, histidine, methionine, thiamine, ascorbic acid, di- or mono-basic potassium phosphate, ammonium carbonate, magnesium sulfate, etc.

With respect to the concentration of the terpenoid substances in the fermentation medium, they may be present in the amount of from 0.005 to 1.2 percent by weight. However, this concentration may depend to some degree on the particular terpenoid substance that is employed. Thus where the designated terpenoid substance is one of the essential oils, the concentration is usually between 0.01 and 1.2 percent. However, with the other specified terpenoid substances which are not classified as essential oils, the concentration to obtain best results may be within the range of 0.005 to 0.4 percent by weight. If an ionone is employed as a supplementary stimulant, then suitable concentrations in the fermentation medium are usually between 0.01 and 0.5 percent by weight.

The terpenoid substance and the ionone may be added to the basal medium at the time of inoculation with the microorganism or may be added some time after the fermentation has begun. It should, however, be added before the fermentation is essentially complete. If a six day fermentation period is contemplated, it is generally preferred to add the terpene substance to the fermenting medium before the end of the third day after inoculation.

In order to demonstrate the effectiveness of the various terpenoid substances as stimulants in the formation of beta-carotene as herein claimed, a series of experiments was carried out. In each of these experiments the basal fermentation medium contained 100 milliliters of 10% distillers' solubles solids to which were added 1% starch, 3% soybean oil and 0.001% thiamine. The basal medium in each instance was placed in 500 milliliter Erlenmeyer flasks and sterilized in an autoclave. After autoclaving the pH was about 6.2. An inoculum was prepared by growing *Choanephora trispora* for 48 hours on a dextrose-carboxymethyl cellulose-phytone medium of high viscosity and in each instance an 8% inoculum containing 4% of *Choanephora trispora* NRRL 2456 and 4% of *Choanephora trispora* NRRL 2457 was added to the fermentation medium. After inoculation the inoculated flasks were agitated at 200 r.p.m. on a conventional rotary shaker and the fermentation was permitted to continue for six days. After the fermentation was complete the cellular or mycelial mass was then homogenized and the excess moisture removed by suction filtration. An aliquot of the mycelium was removed, extracted with acetone and a quantitative determination of beta-carotene was completed by comparing the absorption at 450 millimicrons to that of a standard beta-carotene sample.

In a first experiment using the above technique, a series of four fermentations was carried out in order to determine the optimum concentration of cedarwood oil in the nutrient medium. One flask contained no added cedarwood oil and is designated as the control while the other flasks contained 0.2, 0.5 and 1.0 percent cedarwood oil respectively. The stimulation due to the presence of the cedarwood oil at the various concentrations is indicated in Table 1.

*Table 1*

INFLUENCE OF CEDARWOOD OIL ON BETA-CAROTENE FERMENTATION

| Cedarwood Oil | Mg. beta-carotene/100 ml. medium |
| --- | --- |
| Control | 2.4 |
| 0.2% | 4.6 |
| 0.5% | 9.5 |
| 1.0% | 7.1 |

Thus Table 1 shows that cedarwood oil markedly stimulates the production of beta-carotene when present in the nutrient medium and compared against the control which contained no cedarwood oil additive.

In another experiment seven fermentation flasks were prepared and inoculated and to six of these 0.5 percent cedarwood oil was added at 24 hour intervals over a five day period. The purpose of this experiment was to ascertain whether it was best to add the cedarwood oil at the beginning of the fermentation or at some stage during incubation. The results are tabulated in Table 2.

*Table 2*

VARIATION IN BETA-CAROTENE SYNTHESIS OBTAINED ON ADDITION OF CEDARWOOD OIL AT DIFFERENT TIME INTERVALS

| 0.5% Cedarwood Oil added at— | Mg. beta-carotene/100 ml. medium |
| --- | --- |
| 0 days | 25.4 |
| 1 day | 25.2 |
| 2 days | 23.7 |
| 3 days | 23.0 |
| 4 days | 20.2 |
| 5 days | 16.8 |
| Control (no cedarwood oil) | 7.3 |

It will be seen from the above table that the best stimulation was obtained when the cedarwood oil was present in the medium at the time of inoculation but that the addition of the oil can be delayed if desired.

As previously indicated, certain ionones when added to the medium together with the terpenoid substance will provide additional stimulation of beta-carotene production. In order to demonstrate this, a further experiment was carried out in which flasks were prepared containing the basal medium and cedarwood oil alone, beta-ionone alone and a combination of cedarwood oil and beta-ionone in three different concentrations. In this instance the stimulating substances were added to the fermentation 48 hours after inoculation. The results are indicated in Table 3.

*Table 3*

EFFECT OF ADDING COMBINATIONS OF CEDARWOOD OIL AND BETA-IONONE ON THE BETA-CAROTENE FERMENTATION

| Treatment (48 hours) | Mg. beta-carotene/100 ml. medium |
| --- | --- |
| Control | 2.0 |
| 0.5% cedarwood oil | 21.6 |
| 0.15% beta-ionone | 14.8 |
| 0.5% cedarwood oil +0.03% beta-ionone | 37.2 |
| 0.5% cedarwood oil +0.12% beta-ionone | 31.6 |
| 0.5% cedarwood oil +0.15% beta-ionone | 28.0 |

From the experiment reported in Table 3 it is noted that both cedarwood oil and beta-ionone give some stimulation but that the stimulation is greatly enhanced when a combination of these two materials is added to the fermentation medium. Similar experiments have shown that alpha-ionone and the methyl ionones as alpha, beta, gamma and delta will show the same effect as beta-ionone as set forth in Table 3.

In order to demonstrate that the other terpenoid substances herein claimed are also capable of stimulating beta-carotene production, an experiment was carried out in which several of the claimed terpenoid substances were compared for stimulation against two controls. The results of this experiment are shown in the following table:

Table 4
STIMULATION OF BETA-CAROTENE SYNTHESIS WITH VARIOUS TERPENOID SUBSTANCES

| Terpenoid Substance | Concentration of Terpenoid Substance in Medium, percent | Mg. Beta-carotene/100 ml. fermentation medium |
| --- | --- | --- |
| Sprucewood oil | 0.21 | 35.6 |
| Sandalwood oil | 0.09 | 23.2 |
| Oil rose geranium | 0.12 | 14.4 |
| Cedarleaf oil | 0.20 | 14.4 |
| Camphor | 0.20 | 26.4 |
| Alpha-irone | 0.12 | 17.2 |
| Cedrol | 0.20 | 19.8 |
| Cedrenol | 0.20 | 22.0 |
| Cedryl acetate | 0.20 | 19.6 |
| Cedrenyl acetate | 0.20 | 14.7 |
| Cedrone | 0.20 | 14.8 |
| Cedarwood oil | 0.50 | 18.1 |
| Control #1 | | 5.5 |
| Control #2 | | 4.0 |

The foregoing table clearly demonstrates that the terpenoid substances herein claimed are markedly stimulatory to beta-carotene production by microorganisms of the genus Choanephora when such terpenoid substances are present in the fermentation medium.

As previously indicated, it has been discovered that the presence of the terpenoid substances in the fermentation medium also has a tendency to reduce clumping of the microorganism when it is grown and provides a mycelial growth in a dispersed condition. Thus when the distillers' solubles used in the basal medium as indicated above is decreased to 4 percent, it has been found that the mycelium clumps into a single mycelium mass, thereby preventing the formation of optimum amounts of beta-carotene. In order to demonstrate the ability of cedarwood oil to cause dispersed growth, the basal medium indicated above containing 4 percent distillers' solubles solids was treated with concentrations of cedarwood oil varying from 0.2 to 0.8 percent and inoculated as above indicated. The results are given in Table 5.

Table 5
THE DISPERSION OF MYCELIAL GROWTH BY CEDARWOOD OIL AND THE RELATIONSHIP OF DISPERSED MYCELIAL GROWTH TO BETA-CAROTENE SYNTHESIS

| Cedarwood Oil, Percent | Type of Growth | Mg. Beta-carotene/100 ml. medium |
| --- | --- | --- |
| 0 | Clumped | 1.2 |
| 0.2 | do | 2.3 |
| 0.3 | do | 2.3 |
| 0.4 | do | 2.1 |
| 0.5 | Dispersed | 30.6 |
| 0.6 | do | 27.4 |
| 0.7 | do | 22.0 |
| 0.8 | do | 10.0 |

In view of the foregoing, it has been shown that the several terpenoid substances herein claimed are very effective for increasing the yields of beta-carotene in a fermentation process, utilizing an organism of the genus Choanephora. Additional stimulation is also achieved if one of the ionones is added in addition to the terpenoid substance.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:
1. A process for preparing beta-carotene which includes the step of cultivating a beta-carotene-producing strain of a microorganism of the genus Choanephora in a nutrient medium containing a terpenoid substance selected from the group consisting of cedarwood oil, sprucewood oil, sandalwood oil, oil rose of geranium, cedarleaf oil, camphor, alpha-irone, cedrol, cedrenol, cedryl acetate, cedrenyl acetate and cedrone.

2. The process recited in claim 1 wherein the cultivating step is carried out under aerobic conditions and wherein the microorganism is *Choanephora trispora*.

3. The process recited in claim 1 wherein said medium also contains an ionone selected from the group consisting of beta-ionone, alpha-ionone, methylionone-alpha, methylionone-beta, methylionone-gamma, methylionone-delta and mixtures thereof.

4. A process for preparing beta-carotene which includes the step of cultivating under aerobic conditions a beta-carotene-producing strain of a microorganism of the genus Choanephora in an aqueous nutrient medium containing between about 0.005 and 1.2 percent by weight of a terpenoid substance selected from the group consisting of cedarwood oil, sprucewood oil, sandalwood oil, oil rose of geranium, cedarleaf oil, camphor, alpha-irone, cedrol, cedrenol, cedryl acetate, cedrenyl acetate and cedrone.

5. The process recited in claim 4 wherein said medium also contains between about 0.01 and 0.5 percent by weight of an ionone selected from the group consisting of beta-ionone, alpha-ionone, methylionone-alpha, methylionone-beta, methylionone-gamma, methylionone-delta and mixtures thereof.

6. The process of claim 4 wherein the microorganism is *Choanephora trispora*.

7. A process for preparing beta-carotene which includes the step of cultivating a beta-carotene-producing strain of a microorganism of the genus Choanephora in a nutrient medium containing a fermentable carbohydrate, a protein, a vegetable oil and a terpenoid substance selected from the group consisting of cedarwood oil, sprucewood oil, sandalwood oil, oil rose of geranium, cedarleaf oil, camphor, alpha-irone, cedrol, cedrenol, cedryl acetate, cedrenyl acetate and cedrone.

8. A process for preparing beta-carotene which includes the step of cultivating under aerobic conditions a beta-carotene-producing strain of *Choanephora trispora* in an aqueous nutrient medium containing between about ½ and 4 percent by weight of a fermentable carbohydrate, between about 4 and 12 percent by weight of a proteinaceous material, between about ½ and 4½ percent by weight of a vegetable oil, and between about 0.005 and 1.2 percent by weight of a terpenoid substance selected from the group consisting of cedarwood oil, sprucewood oil, sandalwood oil, oil rose of geranium, cederleaf oil, camphor, alpha-irone, cedrol, cedrenol, cedryl acetate, cedrenyl acetate and cedrone.

9. The process recited in claim 8 wherein said medium also contains between about 0.01 and 0.5 percent by weight of an ionone selected from the group consisting of beta-ionone, alpha-ionone, methylionone-alpha, methylionone-beta, methylionone-gamma, methylionone-delta and mixtures thereof.

10. A process for preparing beta-carotene which includes the step of cultivating under aerobic conditions a beta-carotene-producing strain of *Choanephora trispora* in an aqueous nutrient medium containing a small amount of cedarwood oil.

11. A process for preparing beta-carotene which includes the step of cultivating under aerobic conditions a beta-carotene-producing strain of *Choanephora trispora* in an aqueous nutrient medium containing a small amount of cedarwood oil and a small amount of beta-ionone.

12. A process for preparing beta-carotene which includes the step of cultivating under aerobic conditions a beta-carotene-producing strain of *Choanephora trispora* in an aqueous nutrient medium containing between about ½ and 4 percent by weight of a fermentable carbohydrate, between about 4 and 12 percent by weight of a proteinaceous material, between about ½ and 4½ percent by weight of a vegetable oil and between about 0.005 and 1.2 percent by weight of cedarwood oil.

13. A process for preparing beta-carotene which includes the step of cultivating under aerobic conditions a beta-carotene-producing strain of *Choanephora trispora* in an aqueous nutrient medium containing between about ½ and 4 percent by weight of a fermentable carbohydrate, between about 4 and 12 percent by weight of a proteinaceous material, between about ½ and 4½ perment by weight of a vegetable oil and between about 0.005 and 1.2 percent by weight of cedarwood oil and between about 0.01 and 0.5 percent by weight of beta-ionone.

14. A process for preparing beta-carotene which includes the step of cultivating under aerobic conditions a beta-carotene-producing strain of *Choanephora trispora* in an aqueous nutrient medium containing sprucewood oil.

15. A process for preparing beta-carotene which includes the step of cultivating under aerobic conditions a beta-carotene-producing strain of *Choanephora trispora* in an aqueous nutrient medium containing sandalwood oil.

16. A process for preparing beta-carotene which includes the step of cultivating under aerobic conditions a beta-carotene-producing strain of *Choanephora trispora* in an aqueous nutrient medium containing camphor.

17. A process for preparing beta-carotene which includes the step of cultivating under aerobic conditions a beta-carotene-producing strain of *Choanephora trispora* in an aqueous nutrient medium containing cedrol.

18. A process for preparing beta-carotene which includes the step of cultivating under aerobic conditions a beta-carotene-producing strain of *Choanephora trispora* in an aqueous nutrient medium containing cedrenol.

19. A process for preparing beta-carotene which includes the step of cultivating under aerobic conditions a beta-carotene-producing strain of *Choanephora trispora* in an aqueous nutrient medium containing cedryl acetate.

References Cited in the file of this patent
UNITED STATES PATENTS 2,865,814  Hesseltine et al. _____ Dec. 23, 1958

FOREIGN PATENTS 679,087  Great Britain _____ Sept. 10, 1952

OTHER REFERENCES

Bessey: Morphology and Taxonomy of Fungi, The Blakiston Co., 1950, Philadelphia, pp. 155, 167–8, 185.

Barnett et al.: Science, vol. 123, No. 3187, Jan. 27, 1956, page 141.

Annual Review of Biochemistry (1952), vol. 21, pp. 487–490.

Annual Review of Biochemistry (1953), vol. 22, page 531.

Annual Review of Biochemistry (1955), vol. 24, pp. 510–515.

Annual Review of Biochemistry (1958), vol. 27, page 372.